United States Patent Office 3,574,789
Patented Apr. 13, 1971

3,574,789
POLYESTER PROCESSING AIDS FOR
PVC RESIN
Janis A. Bungs, Willoughby, and Charles L. Sieglaff,
Mentor, Ohio, assignors to Diamond Shamrock Corporation
No Drawing. Filed Sept. 15, 1967, Ser. No. 668,221
Int. Cl. C08g 39/10
U.S. Cl. 260—873    12 Claims

ABSTRACT OF THE DISCLOSURE

Rigid compositions, containing polyvinyl chloride resin, retain desirable rigidity, and exhibit enhanced processing properties, e.g., a lower processing temperature, as a result of blending the resin with a minor amount of low molecular weight (degree of polymerization below about 30) polyester resins. The polyester resins suitable for modifying agents are typically prepared from short chain aliphatic glycol and diacid building blocks. Resulting homogeneous products, in addition to rigidity, retain essentially the desirable physical properties of unmodified solid compositions.

BACKGROUND OF THE INVENTION

Heretofore, plasticizing agents, including low molecular weight aliphatic polyesters, have been used with polyvinyl chloride resin to enhance the flow properties of the resin. However, subsequent solid compositions, for example at room temperature, are generally soft, i.e., do not retain the characteristics of the unplasticized products at comparable temperatures. Thus for polyvinyl chloride resin containing plasticizer, the processing temperature can be reduced by sacrificing the physical properties of resulting products.

SUMMARY OF THE INVENTION

It has now been found that polyester-resin-modified, polyvinyl chloride resin can achieve enhanced processing properties, i.e., a lower processing temperature, as compared to unmodified polyvinyl chloride resin, as a result of lowering the melt viscosity of polyvinyl chloride resin by the interaction of the polyester on such resin. In addition to retaining desirable rigidity, the resulting, homogeneous products can exhibit enhanced tensile stregth and increased deflection temperature without significant sacrifice in impart strength or heat stability. In other words, the improved processing characteristics for the polyvinyl chloride can be achieved either by augmenting, or essentially retaining, the physical properties of rigid compositions. Also, many of the polyester modified resin compositions used produce resulting products which retain the clarity available from the polyester-resin-free solids, and the balance are useful in pigmented compositions and the like where clarity is not a necessary feature.

Moreover, the resinous blend now achieved can provide for increased output in manufactured articles from the augmented processing characteristics. Also, suppressed resin degradation accompanying the reduction in processing temperature permits augmented use of scrap, e.g., sprues, runners and other excess material obtained during use of such resin in the preparation of articles of manufacture, since such scrap material also shows less degradation in processing. Furthermore, modified polyvinyl chloride resin of the present invention can yield manufactured articles, e.g., injection molded containers, exhibiting enhanced surface smoothness and therfore fewer rejected articles arising from surface defects such as striations.

Broadly, the present invention is a resinous material containing polyvinyl chloride resin and polyester resin, which material provides for the production of solid compositions having heat deflection temperatures not substantially lower than about 6° C. below the heat deflection temperature of solid compositions prepared from resinous material which is free from polyester resin, which resinous material comprises rigid polyvinyl chloride resin with between about 2–25 weight parts, basis 100 weight parts of the polyvinyl chloride resin, of at least one polyester having a degree of polymerization below about 30 and a crystalline melting point below the processing temperature of the polyvinyl chloride resin.

The invention further relates to molded products prepared from the resinuous material and also relates to the process of manufacturing rigid articles from resinous material containing polyvinyl chloride resin, by first blending a polyester resin with the polyvinyl chloride resin-containing material.

DESCRIPTION OF THE PREFERRED EMBODIMENTS

For convenience the term "blend," as in "resinous blend," is used herein to refer to a blend of polyvinyl chloride resin with at least one polyester resin employed in the present invention. The resulting products are often referred to herein for convenience simply as the "compositions" or resulting "solid compositions."

The polyvinyl chloride resin contemplated in the use of this invention is a rigid resin, i.e., a resin containing less than about 10 percent plasticizer or none at all. Additionally, its use provides for substantially clear compositions, e.g., ostensibly clear molded or cast articles typically having thickness of one inch or less, and as a result is a resin which is particularly serviceable in the preparation of injection or blow molded containers, extruded articles, as well as other items where rigidity and clarity can be especially desired. Typically, the resin is a readily available commercial resin having a heat deflection temperature of about 64–69° C., a second order transition temperature of about 73–80° C. and is processed at a temperature on the order of about 360° F. or even higher. It is to be understood that the polyvinyl chloride resin as contemplated for use in this invention can be a modified resin, e.g., a copolymer resin of polyvinyl chloride with a minor amount of polyvinyl acetate, or a copolymer resin prepared by copolymerizing vinyl chloride monomer with, for example, up to about 10 weight percent of a modifying substance such as with methyl acrylate monomer or with ethyl acrylate monomer.

An essential criterion for the rigid products prepared from polyester-modified resin compositions is the characteristic of a heat deflection temperature not substantially lower than about 6° C. below the heat deflection temperature of the unmodified, but otherwise compositionally similar, solid products. The heat deflection temperature of rigid compositions produced from polyvinyl chloride resin is most usually an extremely important factor in considering a proposed use for the resin, and thus it is necessary that such characteristic be substantially maintained in any modification of the resin. Compositions exhibiting a heat deflection temperature substantially more than about 6° C. below the heat deflection temperature of comparable but unmodified solid compositions are unsuitable for virtually all of the desired uses of the rigid resin. Typically, for many commercial applications of rigid polyvinyl chloride resin, the heat deflection temperature of the resulting products should be above about 60° C., and thus, advantageously for widest application, the solid compositions of the present invention exhibit a heat deflection temperature above about 60° C. Many of the polyester-resin-containing blends disclosed herein result in compositions essentially maintaining the heat deflection temperature of compositions prepared from unblended rigid polyvinyl chloride resin and often even enhance this characteristic.

For determining the heat deflection temperature of the solid compositions the test employed is in accordance with the ASTM D–648 specifications. The test specimens used are molded bars 5 inches in length and have a ¼" x ½" cross section. The test composition is first dry blended and is then milled, as described hereinafter in more detail in connection with the examples, to form a coherent sheet which is subsequently removed from the mill and cooled. The resulting sheet is cut into strips which are molded at a temperature of about 340°–350° F. and a pressure of about 1000 p.s.i., to directly prepare specimen bars in the desired size for testing. The fiber stress used on the samples is 264 p.s.i. and the immersion medium is a silicone oil heated during the test at an average rate, starting at about 23° C., of 1° C. per minute. Typically, resulting solid compositions maintain the heat deflection temperature of compositions prepared from polyvinyl chloride resin alone or augment such temperature in direct proportion to the concentration of polyester resin contained in the sample, and an increase on the order of 1° C. in the heat deflection temperature is not unusual for compositions prepared from samples containing 20 weight parts of polyester resin basis 100 weight parts of polyvinyl chloride resin.

The polyester resins for blending with the polyvinyl chloride resin should have a degree of polymerization not substantially in excess of about 30. Polyester resins having a degree of polymerization above about 30 are resins which increasingly exhibit high polymer characteristics and are thus often resins which are less readily blended with the polyvinyl chloride resin. Preferably, for retained clarity of solid compositions as well as for efficiency in lowering resin melt viscosity without lowering the heat deflection temperature of resulting products, the polyester resins have a degree of polymerization not in excess of about 25. However, virtually all of the useful polyester resins have a degree of polymerization of at least about 5. Polyesters having a degree of polymerization below about 5 can deleteriously suppress the heat deflection temperature exhibited by resulting solid material. Advantageously, for best maintenance of the heat deflection temperature in subsequent solid material, the polyester resin used has a degree of polymerization above about 7.

Moreover, substantially all of the polyester resins can be characterized as having an inherent viscosity not substantially above about 0.4. Also, virtually all of the polyester resins should have an inherent viscosity above about 0.1; polyesters exhibiting an inherent viscosity below about 0.1 essentially always provide an undesirable suppression of the heat deflection temperature in resulting compositions. Typically, even for polyesters providing clear products, the inherent viscosity for such resins is between about 0.12–0.3.

The inherent viscosity of the polyester resins is determined by measuring at 30° C. the viscosity of the resin in tetrachloroethane relative to the viscosity of the tetrachloroethane alone obtained in the same manner. A 0.5 gram portion of the resin is dissolved in 100 milliliters (ml.) of the tetrachloroethane; thereafter the time of efflux through a viscometer is measured for a 10 ml. portion of the resulting solution as well as for a 10 ml. amount of the tetrachloroethane alone. The relative viscosity ($n_r$) is then calculated as follows:

$T_0$=Solvent flow time in seconds
$T_1$=Solution flow time in seconds
Relative viscosity=$T_1/T_0$ The inherent viscosity ($n_{inh}$) is then calculated as follows:

$$n_{inh}=(\log n_r)/c$$

where $c$ is the concentration as expressed in grams of resin per 100 ml. of solution. A showing of typical capillary viscometers for measuring dilute solution viscosities as well as a review of exemplary viscosity nomenclature is presented, for example, in "Textbook of Polymer Chemistry" by Fred W. Billmeyer, Jr., pp. 128–129 (Interscience Publishers, 1957).

The polyester and copolyester resins of the present invention can be prepared as crystalline substances but need not be so formed. For purposes of this invention crystalline melting points for the polyester and copolyester resins can be determined as a readily observable crystalline melting point peak on a differential thermal analyzer curve (DTA-curve), or as an ostensible crystalline melting point peak where a showing of crystallinity is supported by X-ray diffraction results. Melting point results can be obtained by heating a 5–20 milligram sample of the polyester at 20–40° C. per minute on a differential scanning calorimeter, such as a Model DSC–1 manufactured by the Perkin-Elmer Corporation, until the sample melts or decomposes. Samples which exhibit a readily measurable melting point peak can then be confirmed by cooling at 20–40° C. per minute. Polyester resins showing an ostensible, but not distinct, transition peak on the DTA-curve can then be analyzed by X-ray diffraction, such as by a standard Norelco Diffractometer, employing a sample having a surface area of about 0.75 inch. An ostensible transition peak is deemed suitable for purposes of this invention as a crystalline melting point where the resin thereafter inspected by X-ray diffraction shows a crystalline or substantially crystalline X-ray diffraction pattern, and the balance thus inspected are deemed to be amorphous.

The polyester and copolyester resins which are useful for this invention, i.e., those which form a resinous blend having enhanced processing properties, must have a crystalline melting point below the processing temperature of the polyvinyl chloride resin to which the polyester resin is blended. Advantageously for blending with generally available commercial polyvinyl chloride resins, the polyester resin has a crystalline melting point below about 170° C. Crystalline polyesters for preparing clear solid compositions generally have a crystalline melting point, either ostensible or distinct, below about 150° C. Moreover, polyester resins in amorphous form which are useful in preparing clear solid compositions nearly always have second order transition temperature above about 50° C.

The balance of the polyester resins, i.e., in part those crystalline resins having a melting point above about 150° C., will almost always form unclear, e.g., hazy to translucent, final materials which are useful where clarity is not an essential feature, such as in irrigation and other pipe applications of the solid compositions. But, substantially all of the amorphous polyesters having second order transition temperatures below about 20° C., when blended with polyvinyl chloride resin and after processing of the resulting blend, act in the maner of plasticizers to undesirably suppress the heat deflection temperature of subsequent compositions.

For purposes of this invention, the polyester resins used are those prepared from essentially completely saturated precursors in respect to being free from non- benzenoid unsaturation, i.e., the polyester resins are not contemplated to be used in the blend for subsequent reaction by cross-linking with vinyl monomers to form thermoset copolymers. Although the polyester resins might be considered as being very low in molecular weight in that they have a degree of polymerization below about 30, the content of monomeric or dimeric esters remaining in the resins is advantageously less than about 5 weight percent, to form solid compositions of enhanced heat deflection temperature. Preferably for best heat deflection temperature in the resulting solid material, the reaction product contains about 1 to 2 weight percent or less of monomeric plus dimeric material.

It has been found that the reaction of short carbon chain aliphatic glycols such as ethylene glycol or propylene glycol with a short carbon chain aliphatic diacid such as oxalic or malonic acid can lead to the preparation of crystalline resinous materials which are difficult to readily blend with the polyvinyl chloride resin for enhancing processing characteristics. On the other hand, when longer carbon chain aliphatic diacids such as adipic, suberic, or sebacic, acids and longer chain aliphatic glycols such as hexamethylene glycol are used in the preparation of the polyester resins, the resulting aliphatic-precursor-derived polyesters prepare solid products exhibiting undesirable heat deflection temperatures.

It has thus been found that the useful copolyester and polyester resins have, in chemically combined form, either: (1) a substantially aromatic acidic moiety with an aliphatic polyol moiety; or, (2) a substantially aromatic polyol moiety with an aliphatic acidic moiety; or, (3) an aromatic-containing polyol moiety reacted with an aromatic-containing acidic moiety. For convenience, the compounds contributing esterifiable carboxyl groups for ester formation are referred to herein as the "acidic moiety" and the compounds contributing the balance of the reactive groups for ester formation as the "polyol moiety."

To form solid products with enhanced heat deflection temperature, some of the useful polyester resins are prepared from a "substantially" aromatic acidic moiety reacted with an aliphatic polyol moiety. That is, this acidic moiety is from about 90 mole percent up to 100 mole percent of aromatic dicarboxylic acids which are either benzene dicarboxylic-acid-providing compounds, e.g., phthalic acid, or polynuclear benzene dicarboxylic acids, e.g., naphthalic acid, or their mixtures. Thus, up to about 10 mole percent of the acidic moiety can be contributed by $C_2$–$C_{36}$ aliphatic dicarboxylic acids. Additionally, aliphatic polycarboxylic acids having more than two carboxyl groups per molecule can be used, but should not be more than about 5 mole percent of the acidic moiety to avoid preparing polyester resins which will not readily blend with polyvinyl chloride resin in the sense of forming desirable homogeneous solid compositions.

The aliphatic polyol moiety for reaction with the substantially aromatic acidic moiety is from about 50 mole percent up to 100 mole percent of $C_2$–$C_8$ aliphatic glycols, or $C_n$ cycloaliphatic glycols, wherein $n$ is an even integer of six, eight, or even higher, e.g., twelve or more, or mixtures of such glycols. For maintaining best heat deflection temperature in solid products, either or both of these glycols should contribute at least 50 mole percent of the polyol moiety, hence up to 50 mole percent of such moiety can be contributed by long-chain acylic aliphatic glycols. Furthermore, aliphatic polyols having more than two hydroxyl groups can be used but should not exceed about 5 mole percent of the moiety to avoid producing polyester resins which cannot be readily mixed with polyvinyl chloride resin for forming desirable homogeneous solid products.

Other of the useful polyester and copolyester resins are prepared by reacting a substantially aromatic polyol moiety with an aliphatic acidic moiety. This acidic moiety is about 95–100 mole percent of $C_2$–$C_{36}$ aliphatic dicarboxylic acids; furthermore, it can be up to about 5 mole percent of polycarboxylic acids having more than two carboxyl groups per molecule. For the preparation of solid products having enhanced heat deflection temperature, the substantially aromatic polyol moiety is from about 90 mole percent up to 100 mole percent of diphenols such as those having a single benzene nucleus, e.g., hydroquinone and pyrocatechol. Also, such diphenols can have a condensed benzene nucleus such as in the compound 1,2-anthradiol, or can be alkylidene diphenol, also referred to herein as alkylidene biphenols, for example 4,4'-methylenebiphenol or can additionally be an aliphatic-aromatic glycol such as p,p'-xylylenediol, or mixtures of any or all of these useful polyhydroxyl compounds. Therefore, up to about 10 mole percent of this polyol moiety can be supplied by $C_2$–$C_8$ aliphatic glycols, or the cycloaliphatic glycols mentioned hereinabove, or their mixtures; furthermore, up to about 5 mole percent can be furnished by aliphatic polyols having more than 2 esterifiable hydroxyl groups per molecule.

The balance of the useful polyester and copolyester resins are prepared from an aromatic-containing polyol moiety and an aromatic-containing acidic moiety. For the preparation of solid products of enhanced heat deflection temperature each moiety contains at least about 45 mole percent of aromatic difunctional compounds. That is, the polyol moiety is about 45–100 mole percent of the above mentioned diphenols and the acidic moiety is about 45–100 mole percent of the earlier mentioned aromatic dicarboxylic acids. The balance of the acidic moiety can be up to about 55 mole percent of $C_2$–$C_{36}$ aliphatic dicarboxylic acids and also can include up to about 5 mole percent of polycarboxylic acids. The balance of the polyol moiety can be up to 55 mole percent of the $C_2$–$C_8$ aliphatic and the cycloaliphatic glycols mentioned before. Additionally, this polyol moiety can contain long-chain acylic aliphatic glycols but should not contain more than about 10 mole percent of such long-chain glycols to avoid deleterious suppression of the heat deflection temperature in resulting solids. Also, the polyol moiety can contain up to about 5 mole percent of aliphatic polyols having more than two hydroxyl groups per molecule.

To enhance the reaction time and for economy, polyol moieties containing aliphatic glycols advantageously include at least a portion of one or more low molecular weight glycols, i.e., ethylene glycol, 1,2-propylene glycols, or 1,3-propylene glycol. Preferably, for best economy and efficiency, such polyol moieties contain at least about 90 mole percent of $C_2$–$C_3$ aliphatic glycols.

Excessive aromaticity can sometimes provide polyesters having undesirable characteristics such as excessive crystallinity, and thus polyesters which do not readily blend with the polyvinyl chloride resin to enhance processing properties. Therefore, to avoid excessive aromaticity when an aromatic-containing polyol moiety is reacted with an aromatic-containing acidic moiety, e.g., resorcinol with isophthalic acid, preferably at least about 10 mole percent of either moiety, or 5 mole percent basis the combined moieties, is provided by aliphatic compounds.

The benzene dicarboxylic-acid-providing compounds, i.e., benzene based substances providing two esterifiable carboxyl groups per molecule, typically include terephthalic acid, isophthalic acid, phthalic acid, and their diethyl and dimethyl esters, phthalic anhydride, 3-methyl phthalic acid, 4-methyl phthalic acid, 3,4-dimethyl phthalic acid and the like. The polynuclear benzene dicarboxylic acids are based upon anthracene and naphthalene and the like structures and suitable representative acids include naphthalic acid and 1,2-naphthalenedicarboxylic acid.

The suitable $C_2$–$C_{36}$ aliphatic dicarboxylic acids are conveniently homologues of oxalic acid and include malonic succinic, glutaric, adipic, suberic, and sebacic acids, and the like, as well as mixtures of the foregoing. Typical aliphatic polycarboxylic acids, i.e., providing more than two carboxyl groups per molecule, and which can or have been used to prepare the polyester resins of the present invention include 1,2,3-propanetricarboxylic acid; also, such polycarboxylic acids as the term is used herein are meant to include the so-called "dimer" acids, i.e., usually mixtures of dimer, and trimer acids, with particularly useful "dimer" acids including those formed from linoleic, palmitolic, humoceric, and eicosinic acids, which are commercially available as mixtures containing about 3–25 parts of dimer acids per part of trimer acid.

Typical glycols suitable for supplying the $C_2$–$C_8$ aliphatic glycols include, in addition to those compounds mentioned hereinbefore, the following: diethylene glycol, dipropylene glycol, 2,2-dimethyl-1,3-propanediol, 1,4-butylene glycol, 1,5-pentanediol, trimethylene glycol, 1,3-butylene glycol, 1,2-butylene glycol, 1,4-pentanediol, 1,6-hexamethylenediol, and 2-ethyl-1,3-butanediol. Suitable cycloaliphatic glycols which can or have been used include 1,4-dihydroxycyclohexane and 1,4-cyclohexanedimethanol.

The "long-chain" aliphatic glycols as the term is used herein are acyclic dihydric aliphatic compounds having more than eight carbon atoms. Typical of this group which are suitable for preparing the polyesters employed in this invention include 1,10-decanediol and polyethylene and polypropylene glycols. Suitable aliphatic polyols having more than two hydroxyl groups per molecule include glycerol, 1,2,6-hexanetriol, trimethylolpropane, pentaerythritol, and their oxyethylation and oxypropylation products.

Typical diphenols for purposes of this invention, in addition to those materials mentioned above, include other alkylidene diphenols such as 4,4'-dihydroxydiphenyldimethyl methane, as well as including other single benzene-nucleus-containing diphenols, i.e., resorcinol, also other diphenols having a condensed benezene nucleus such as 2,6-anthracenediol, 2,7-naphthalenediol, 1,5-naphthalenediol and the like, as well as aliphatic-aromatic glycols such as $\alpha,\alpha'$-bis-(2-hydroxyethoxy)-p-xylene.

Suitable polyester resins which can or have been used for preparing clear, rigid products include poly(hexamethylene terephthalate), poly(tetramethylene isophthalate), poly(1,3-butylene terephthalate), poly(1,3-propylene isophthalate), poly(1,2-propylene terephthalate), poly(1,2-propylene isophthalate), poly(2,2-dimethyl-1,3-propylene terephthalate), and poly(1,2-propylene-co-1,4-cyclohexylene-dimethylene terephthalate). Suitable polyester resins which can or have been used where clarity is not an essential feature for the final product include poly(ethylene isophthalate), poly(4,4'-isopropylidene-diphenylene phthalate), poyl(ethylene terephthalate-co-isophthalate), and poly(ethylene-co-dioxyethylene terephthalate).

Generally between about 2–25 weight parts of these polyester resins are used, basis 100 weight parts of polyvinyl chloride resin. Less than about 2 weight parts of the polyester resin can result in an insignificant enhancement in the processing properties of the resin, while greater than about 25 weight parts can be uneconomical. Preferably, for best economy and enhanced resin processing properties, about 4–20 weight parts of polyester resin are employed.

When glycols containing esterifiable primary and secondary hydroxyl groups supply some to all of the esterifiable groups, the secondary hydroxyl groups of the glycol can be less susceptible than the primary hydroxyl groups to esterification. Thus when esterification involves a substance such as 1,2-propylene glycol, it is advantageous, for achieving a shortened reaction time, to employ a substantial molar exces of the glycol; also, in such instances, for the preparation of a polyester or copolyester product having a desirably low amount of monomeric and dimeric material, it is advantageous to employ an extended reaction time. Typically where the esterifiable hydroxyl groups are preponderantly all to completely all primary hydroxyl groups, only a slight molar excess of glycol, e.g., about 1.1–1.2 moles of glycol, are employed per mole of acidic moiety to enhance completion of the reaction. However, where substantial amounts of 1,2-propylene glycol or like glycols are used about 1.5–2.2 moles thereof are generally used per mole of the acidic moiety.

For determining the progress of the reaction, it is preferable to measure the viscosity of the reaction products by a visocometer determination. Typically when a sample exhibits a 10–15 second difference in flow time between the solvent alone and the solution of solvent plus resinous material the reaction can be stopped and the resulting product will contain a desirably low concentration of monomeric and dimeric materials. For measurement of this time difference, usually only a 0.5 gram sample of resinous composition need be used and this can be dissolved in 100 milliliters of suitable solvent, e.g., tetrachloroethane. Then at a constant temperature such as 30° C., the time of efflux through the viscometer can be measured for the solvent alone and for a portion, such as a 10 milliliter portion of the polyester solution. As the reaction approaches completion, excess glycol can be removed from the resinous composition, such as by heating the reaction product at elevated temperature and reduced pressure to strip the glycol from the resinous product.

Typically, by employing a preferred amount of polyester resin, the melt viscosity of the resulting polyester-polyvinyl chloride resinous blend will be about 40–80 percent of the melt viscosity of unmodified polyvinyl chloride resin under comparable conditions of temperature and pressure. Advantageously, for augmented rate of production in the manufacture of articles from such resinous blend, e.g., by conventional extrusion apparatus, the melt viscosity of the blend is at least about 10 percent below that of unmodified polyvinyl chloride resin under comparable temperature and pressure conditions. Typically, a reduction in melt viscosity for the blend allows a reduction in the processing temperature for the blend, as compared with the processing temperature employed for the unmodified polyvinyl chloride. e.g., down to a temperature within the range from about 320° F. to about 360° F. More particularly, a blend of a commercial polyvinyl chloride resin containing 15 parts by weight of polypropylene terephthalate polyester resin, per 100 weight parts of polyvinyl chloride resin, exhibits an about 40 percent melt viscosity reduction and a processing temperature range of about 320°–340° F. compared to an about 350–370° F. range for the unmodified polyvinyl chloride.

Generally, the polyester resin is simply a comminuted solid which is dry blended with particulate, solid polyvinyl chloride resin to form a particulate resin blend. This blend can then be stored for subsequent use or it can be processed.

In addition to the polyvinyl chloride resin and the polyester resin, the resinous blend usually contains further substances including impact modifiers for the polyvinyl chloride resin such as chlorinated polyethylenes and styrene-acrylonitrile copolymers, and heat and/or light stabilizers for the polyvinyl chloride resin including such materials as metallic soaps and organic tin compounds which may or may not contain sulfur. Also antistatic agents, lubricants, e.g., waxes, and antioxidants for the polyvinyl chloride resin can be employed in the resinous blend. Furthermore, the blend can include minor amounts of pigments, dyes, fillers, and colorants for preparing pigmented, filled, or tinted final products; but, such additives preferably do not form a separate solid phase, or preferably are not present in sufficient amougnts, or are even excluded, where a clear article is sought and such materials will sacrifice the desired clarity in the manufactured article.

The following examples show ways in which the invention has been practiced but should not be construed as limiting the invention. In the examples all parts are parts by weight and all temperatures are in degrees centigrade unless otherwise specified.

In the examples, homogeneity of the resinous blends is tested by first dry blending 100 weight parts of particulate polyvinyl chloride resin with 10 weight parts of the polyester resin to be tested, also in particulate form, and adding during blending three weight parts of a clear, liquid organotin mercaptide thermal stabilizer having a freezing point of $-35°$ F., a specific gravity at 25° C. of 1.11 and a viscosity at 25° C. of 33.2 centipoises. After dry blending, which thus prepares from about 80 to about 600 grams of blended material, the blend is poured into the nip of either a 3" x 7" or a 6" x 13" two-roll mill, the selection of the particular mill depending upon the amount of blend available for testing. The rolls are maintained at a temperature of 340° F. and as the milling is initiated the nip is held essentially as narrow as can be accommodated without sustaining metal-to-metal contact and thereafter the opening is gradually adjusted to accommodate the batch size. As the batch fluxes on the mill a coherent mass is obtained, and thereafter a soft, elastic sheet is removed from the mill and the sheet is allowed to air cool. The thickness of the sheet obtained depends upon the weight of the batch originally used as well as the mill employed. Portions of the sheet are molded at 200° C. under a pressure of 1000 p.s.i. to prepare rigid specimen moldings. If the resinous blend is compatible these specimen moldings are transparent, having the appearance of glass.

Relative melt viscosities in the examples are obtained by comparing the dynamic melt viscosities of resinous blends to such blends free from the polyester modifier. The data for the relative melt viscosities is expressed as a ratio of the viscosity for the blend to the viscosity for the polyvinyl chloride resin alone assuming such last viscosity to be a unit, i.e., 1. The melt viscosity values are obtained in accordance with the method described in "Rheological Properties of PVC," an article by Dr. C. L. Sieglaff, in the Society of Plastics Engineers, Transactions, April 1964, pp. 129–138, using a Sieglaff-McKelvey rheometer manufacted by the Tinius Olsen Testing Machine Company. Typically a 3–5 gram sample of the resin to be tested is employed and the rheometer is operated at 190° C. for a full shear rate range of from 1 sec.$^{-1}$ through 1000 sec.$^{-1}$. Melt viscosity values are then read from the melt flow curve derived by plotting the shear stress values vs. the shear rate values obtained from the rheometer.

In the examples, average molecular weights for the polyester resins are determined by a vapor pressure osmometer, Model 302, manufactured by Mechrolab Inc. The solvent employed for each polyester resin is tetrachloroethane, the instrument operates with a 100° C. thermostat and probe, and three samples of varying concentration of polyester are used for each resin. The method then employed to obtain molecular weights is the intercept method, i.e., the instrument readings divided by concentration are plotted vs. concentration and the resulting plot extrapolated back to zero (K intercept) for comparison with the intercept of a known standard.

In the examples the dimethyl ester of terephthalic acid is generally identified as "DMT" for convenience and for like reason the dimethyl ester of isophthalic acid is generally abbreviated to "DMI."

Example 1

A catalyst mixture is prepared by grinding together 100 parts of DMT, 0.4 part of lead oxide and 1 part antimony trioxide. Then 10 parts of the resulting material is added to 184 parts of additional DMT and 96 parts of propylene glycol and these ingredients are reacted under an inert nitrogen atmosphere while refluxing for removal of by-product methanol. Thereafter methanol removal is virtually finished, and the resulting composition is heated to a temperature of 200° under a reduced pressure of 0.5 mm. Hg., to promote condensation and strip excess propylene glycol from the composition.

During this glycol stripping the viscosity of the reaction composition is measured to determine the progress of the reaction. For this, 0.5 gram samples of the composition are taken and dissolved in 100 milliliters of tetrachloroethane. At a temperature of 30° the time of efflux through a viscometer is measured for the tetrachloroethane solvent alone and for a 10 milliliter portion of the freshly prepared solution of reaction composition plus solvent. During the glycol stripping, a sample shows about 16 seconds difference in flow time between solvent and solution and the reaction is then terminated by returning to atmospheric pressure allowing the composition to cool and solidify.

The resulting poly(1,2-propylene terephthalate) polyester resin is a clear, colorless and brittle solid, having a second order transition temperature of 73°, as determined from the inspection of the DTA-curve for the resin obtained by a differential scanning calorimeter. Furthermore, this resin has an average molecular weight of 1800 and an average degree of polymerization of about 9, as determined by dividing the average molecular weight of the resin by the molecular weight of 1 mer. unit (a weight unit of 206), i.e., the molecular weight corresponding to the residue obtained in the polyester resin for one molecule of propylene glycol reacted with one molecule of DMT.

Example 2

To 100 parts of a commercial white, powdered polyvinyl chloride resin having a second order transition temperature of about 76°, a specific viscosity of 1.10, 0.5% maximum moisture, a bulk density of 35 lbs. per cu. ft., a K value of 61.9 for 5 grams per 100 milliliters of cyclohexanone at 25°, and a screen analysis of 100% through a 40 mesh U.S. Standard Sieve, there is blended 10 parts of particulate poly(1,2-propylene terephthalate) polyester resin prepared in Example 1. When portions of this resinous blend are mixed with the organotin mercaptide thermal stabilizer described hereinbefore and tested for homogeneity, resulting specimen moldings and showed excellent transparency, having the appearance of clear glass.

Three additional blends of the polyvinyl chloride resin, containing 10, 15, and 20 parts, respectively, by weight of the poly(1,2-propylene terephthalate) resin of Example 1 per 100 parts of polyvinyl chloride resin are each tested for melt viscosities in the manner described above. Also, the polyvinyl chloride resin alone is tested as a control and to obtain relative melt viscosities, i.e., melt viscosities of the blend as expressed as a percentage of the melt viscosity exhibited by the polyvinyl chloride resin alone. The results are set forth in the Table 1 below, with the relative melt viscosities being an average of determinations measured at a full shear rate range from 1 sec.$^{-1}$ through 1000 sec.$^{-1}$.

TABLE 1

| Weight amount of polyester resin | Temperatrue of viscostiy measurement, ° C. | Relative melt viscosity, percent |
| --- | --- | --- |
| 10 | 190 | 0.59 |
| 15 | 190 | 0.57 |
| 20 | 190 | 0.41 |

As can be readily seen from the results of this test, the poly(1,2-propylene terephthalate) resin provides an excellent reduction in melt viscosity for the resinous blend, compared to the melt viscosity exhibited by the polyvinyl chloride resin alone.

Additional resinous blends containing polyvinyl chloride are prepared with the poly(1,2-propylene terephthalate) polyester resin described hereinabove. However, these blends instead of containing 10 parts of polyester resin per 100 parts of polyvinyl chloride resin, contain 5, 15, and 20 parts, respectively. Samples of these resins are then tested for impact strength according to the method described in ASTM-D 256 (Izod). Additional samples are tested for heat deflection temperature according to the method prescribed in ASTM D-648, and for tensile strength according to the ASTM D-638 procedure. The results for these tests are set forth in Table 2 below.

TABLE 2

| Polyester resin amount, by weight | 0 | 5 | 10 | 15 | 20 |
| --- | --- | --- | --- | --- | --- |
| Impact strength, ft. lbs./in | 0.7 | 0.5 | 0.5 | 0.5 | 0.5 |
| Deflection temperature, ° C | 65.1 | 65.5 | 65.4 | 65.9 | 66.1 |
| Tensile strength, p.s.i | 7,600 | 7,900 | 8,200 | 8,300 | 8,300 |

Additional batches of polyvinyl chloride resin are prepared as described above and contain 5, 10, 15, and 20 parts of polyester resin per 100 parts of polyvinyl chloride resin, but the polyester resin used is a poly(1,2-propylene terephthalate) having an average degree of polymerization of 14–15 and a second order transition temperature of 80°. Samples of these batches are tested for impact strength, tensile strength, and deflection temperature according to the respective ASTM methods mentioned hereinbefore. Results of these tests for the various resinous materials are set forth in Table 3 below.

TABLE 3

| Polyester resin content | 0 | 5 | 10 | 15 | 20 |
|---|---|---|---|---|---|
| Impact strength, ft. lbs./in | 0.7 | 0.6 | 0.5 | 0.5 | 0.5 |
| Deflection temperature, °C | 65.1 | 65.5 | 65.3 | 67.0 | 66.5 |
| Tensile strength, p.s.i | 7,600 | 7,710 | 7,751 | 7,860 | 7,860 |

The results from these tests in both Table 2 and Table 3 show that impact strength of solid compositions is virtually retained as the proportion of polyester resin is increased in the resinous blend. Concurrently the deflection temperature desirably increases and the tensile strength likewise shows a desirable increase for the resulting solids as the polyester resin proportion increases in the blend. Hence, in addition to enhanced processing properties the resinous blend can provide essentially the same, or can desirably augment, the physical properties obtained or exhibited by resulting solid compositions.

Example 3

A catalyst mixture is prepared by blending together 98.6 parts of DMI, 0.4 part of lead oxide and 10 parts antimony trioxide. To 10 parts of the resulting catalyst described is added 184.0 parts of DMI and 114.0 parts of 1,2-propylene glycol. These ingredients are reacted in the manner of Example 1 and stripped until a portion shows an about 7.8 seconds difference in the time of efflux through a viscometer as determined by the method of Example 1. The resulting poly(1,2-propylene isophthalate) is a clear, brittle solid and has an inherent viscosity of 0.17, an average degree of polymerization of about 22, a second order transition temperature of 55°.

Example 4

To 10 parts of the catalyst mixture described in Example 3 there is added 184 parts of additional DMI and 167.2 parts of 1,3-propylene glycol. These ingredients are reacted in the manner of Example 1 and stripped until a portion shows an about 12.3 seconds difference in the time of efflux through a viscometer as determined by the method of Example 1. The resulting poly(1,3-propylene isophthalate) is an ostensibly clear, brittle solid having a yellowish hue and has a second order transition temperature of 20°, an inherent viscosity of 0.19, and an average degree of polymerization of about 25.

Example 5

To 10 parts of the catalyst mixture described in Example 1 there is added 184.0 parts of DMT and 228.2 parts of 2,2-dimethyl-1,3-propylene glycol. These ingredients are reacted in the manner of Example 1 and stripped until a portion shows an about 11.9 seconds difference in the time of efflux through a viscometer as determined by the method of Example 1. The resulting poly(2,2-dimethyl-1,3-propylene terephthalate) is a brittle solid of hazy appearance and has an inherent viscosity of 0.19, an average degree of polymerization of about 22 and a second order transition temperature of 60°.

Example 6

To 10.0 parts of the catalyst mixture described in Example 3 there is added 184.0 parts of DMI and 93.0 parts of ethylene glycol. These ingredients are reacted in the manner of Example 1 and stripped until a portion shows an about 8.5 seconds difference in the time of efflux through a viscometer as determined by the method of Example 1. Resulting poly(ethylene isophthalate) is a white, opaque, brittle solid and exhibits a second order transition temperature of 49°, a melting point of 60°, an average degree of polymerization of about 7, and an inherent viscosity of 0.13.

Example 7

To 10 parts of the catalyst mixture described in Example 1 there is added 184 parts of DMT, 167.2 parts of propylene glycol and 20.9 parts of a liquid polyoxypropylene derivative of trimethylolpropane having a molecular weight of about 4100, an average hydroxyl number (KOH/gm.) of about 41, and a viscosity at 25° of about 670 centipoise. These ingredients are reacted in the manner of Example 1 at a temperature of 145–221° for 21.5 hours and then stripped as described in Example 1 at a temperature maintained within the range of 177–231° and at a pressure of 0.5 mm. Hg for a time of three hours. The reaction is then terminated and the composition allowed to cool.

The resulting polyester, i.e., the reaction product of the dimethyl terephthalate, propylene glycol, and polyoxypropylene triol is an opaque, brittle solid having a second order transition temperature of 55°. Owing to slight crosslinking within the resin the inherent viscosity and average degree of polymerization are not determined; however, a similar resin, prepared in like manner but having a weight ratio of propylene glycol to polyoxypropylene triol of 98:2, and further having a second order transition temperature of 57°, exhibits an average degree of polymerization of about 14 and an inherent viscosity of about 0.14.

A 10 part portion of the polyester resin thus prepared is blended with 100 parts of the polyvinyl chloride resin of Example 2 and also with organotin mercaptide thermal stabilizer described hereinbefore. Resulting specimen moldings prepared from this resinous blend, in the manner described above, exhibit excellent transparency and have the appearance of clear glass. In accordance with the test procedure described in ASTM D–648, a sample from the resulting resinous blend shows a heat deflection temperature of 67.9°. Relative melt viscosities for the resulting resinous blend are given in the table below for the shear rates shown in the table below.

| Shear rates: | Relative melt viscosity |
|---|---|
| 1 sec.$^{-1}$ | 0.74 |
| 10 sec.$^{-1}$ | 0.88 |
| 100 sec.$^{-1}$ | 0.94 |
| 1000 sec.$^{-1}$ | 0.84 |

Example 8

To 10 parts of the catalyst mixture described in Example 1 there is added 184.0 parts of DMT, 156.0 parts of propylene glycol and 14.4 parts of 1,4-cyclohexanedimethanol. These ingredients are reacted in the manner of Example 1 and stripped until a portion shows an about 13.9 seconds difference in the time of efflux through a viscometer as determined by the method of Example 1. The resulting poly(1,2-propylene-co-1,4-cyclohexylenedimethylene terephthalate) is an ostensibly clear, brittle solid and has an inherent viscosity of 0.21 and a second order transition temperature of 69°.

To 100 parts of the polyvinyl chloride resin of Example 2 there is added 10 parts of the polyester resin thus prepared. Additional resinous mixtures are made in the same way for the polyester resins prepared in Examples 3, 4, and 5. Portions of the four resulting resinous blends are each mixed with a thermal stabilizer and tested for homogeneity. All resulting specimen moldings show excellent transparency, except for the specimen molding from the Example 4 polyester resin which exhibits slight ostensible haziness which is attributed to the average degree of polymerization of such resin being about 25. Additional samples of the resinous blends thus prepared are tested for heat deflection temperature according to the ASTM D–648 method, as well as for relative melt viscosity. The results of such tests are set forth in the following table.

| Polyester resin | Heat deflection temperature, °C. | Relative melt viscosity, shear rates at Sec.$^{-1}$ | | | |
|---|---|---|---|---|---|
| | | 1 | 10 | 100 | 1,000 |
| None (rigid polyvinyl chloride resin alone) | 65.1 | | | | |
| Poly(1,3-propyleneisophthalate) | 61.4 | | 0.54 | 0.65 | 0.69 |
| Poly(2,2-dimethyl-1,2-propylene terephthalate) | 67.2 | 0.59 | 0.65 | 0.73 | 0.73 |
| Poly(1,2-propylene-co-1,4-cyclohexylene dimethylene terephthalate) | 67.1 | 0.76 | 0.75 | 0.87 | 0.82 |
| Poly(1,2-propylene isophthalate) | 64.9 | | 0.46 | 0.62 | 0.70 |

It is thus seen that in addition to providing clear castings the above tabulated polyester resins maintain, or even enhance, the heat deflection temperature in resulting solid compositions compared to such compositions prepared from polyester-free resin, as well as imparting a desirable reduction in the relative melt viscosity for the resuling resinous blends.

Example 9

To 10 parts of the catalyst mixture described in Example 1 is added 145.2 parts of additional DMI, 38.8 parts of DMT, and 136.4 parts of ethylene glycol. These ingredients are reacted in the manner of Example 1 and stripped until a portion shows an about 10.4 seconds difference in the time of efflux through a viscometer as determined by the method of Example 1. The resulting poly(ethylene terephthalate-co-isophthalate) is a hazy, brittle solid and has an inherent viscosity of 0.16, an average degree of polymerization of about 15 and a second order transition temperature of about 65°.

Specimen moldings prepared from a resinous blend of the resulting polyester resin with the polyvinyl chloride resin of Example 2 and thermal stabilizer are translucent thus indicating the incompatability of the resins. However, a solid sample from the blend tested according to the procedure described in ASTM D-648 shows a heat deflection temperature of 64.5°. Therefore this polyester is regarded as suitable for blending with polyvinyl chloride resin where clarity of resulting articles is not a requirement.

Example 10

To 10.0 parts of the catalyst mixture described in Example 1 there is added 184.0 parts of DMT, 105.4 parts of ethylene glycol, and 53.0 parts of diethylene glycol. These ingredients are reacted in the manner of Example 1 and stripped until a portion shows an about 13.1 seconds difference in the time of efflux through a viscometer as determined by the method of Example 1. The resulting poly(ethylene - co - dioxyethylene terephthalate) is an ostensibly hazy, brittle solid and has a crystalline melting point of 198°, an average degree of polymerization of about 21 and an inherent viscosity of 0.21. Specimen moldings indicate incompatability for blends of the resulting polyester with polyvinyl chloride resin but such specimens exhibit a heat deflection temperature of 65.3°, therefore demonstrating a suitability of such polyester for applications where clarity is not required.

Example 11

To 10.0 parts of the catalyst mixture described in Example 1 there is added 184.0 parts of DMT, 117.8 parts of ethylene glycol, and 240.0 parts of a polyethylene glycol having average molecular weight of about 600, a melting point of about 20–25° and a specific gravity at 25° of 1.125–1.128. These ingredients are reacted in the manner of Example 1 and stripped until a portion shows an about 15.8 seconds difference in the time of efflux through a viscometer as determined by the method of Example 1. The resulting copolyester is a soft, opaque solid having a grayish hue and exhibits a degree of polymerization of about 8, a second order transition temperature of −47°, and an inherent viscosity of 0.24.

Specimen moldings are then prepared from both a resinous blend of the resulting polyester resin with the polyvinyl chloride resin of Example 2 and thermal stabilizer, as well as from a resinous blend of such polyvinyl chloride resin, thermal stabilizer, and the polyester resin prepared in Example 6. Moldings from both such blends are translucent and indicate the incompatability of each polyester resin for polyvinyl chloride resin. Additional portions of the resinous blends, containing 10 parts of Example 6 polyester resin per 100 parts polyvinyl chloride resin and 10 parts of Example 11 polyester resin per 100 parts of polyvinyl chloride resin are tested both for relative melt viscosity and also for heat deflection temperature of resulting compositions according to the ASTM D-648 method. The results of such tests are set forth in the table below.

| Polyester resin | Heat deflection temperature, °C. | Relative melt viscosity, shear rates at sec.$^{-1}$ | | | |
|---|---|---|---|---|---|
| | | 1 | 10 | 100 | 1,000 |
| None (rigid polyvinyl chloride resin alone) | 65.1 | | | | |
| Poly(ethyleneisophthalate) | 63.0 | 0.71 | 0.80 | 0.85 | 0.80 |
| Poly(ethylene-co-polyoxyethylene terephthalate) | 60.9 | 0.47 | 0.38 | 0.29 | |

It is thus seen from the above table, that, although clear castings are not obtained, these polyester resins desirably provide for maintained heat deflection temperature in resulting solids, as well as impart a substantial reduction in the relative melt viscosity for the resinous blends.

It is to be understood that, although the invention has been described with specific reference to particular embodiments thereof, it is not to be so limited, since changes and alterations therein may be made which are within the full intended scope of this invention as defined by the appended claims.

We claim:

1. A resinous material containing polyvinyl chloride resin and polyester resin and characterized by enhanced processing properties, wherein rigid, solid compositions prepared from said resinous material have a heat deflection temperature not substantially lower than about 6° C. below the heat deflection temperature of solid compositions prepared from said resinous material free from said polyester resin, which resinous material comproses rigid polyvinyl chloride resin with between about 2–25 weight parts, basis 100 weight parts of said polyvinyl chloride resin, of at least one polyester resin having a degree of polymerization below about 30 and selected from the group consisting of crystalline polyester resins and amorphous polyester resins, said crystalline polyester resins having a crystalline melting point below the processing temperature of said polyvinyl chloride resin, and said amorphous polyester resins having a second order transition temperature above 20° C.

2. The resinous material of claim 1 wherein said polyester resin is present in an amount of about 4–20 weight parts basis 100 weight parts of said polyvinyl chloride resin, said polyester resin has a degree of polymerization between about 5–25, said crystalline polyester resins have a crystalline melting point of less than about 170° C., said amorphous polyester resins have a second order transition temperature above about 50° C., and compositions prepared from said resinous material have heat deflection temperatures above about 60° C.

3. The resinous material of claim 1 wherein said polyester resin is selected from the group consisting of group (A) polyester and copolyester resins consisting essentially of (1) a substantially aromatic acidic moiety and (2) an aliphatic polyol moiety in chemically combined form, group (B) polyester and copolyester resins consisting essentially of (3) a substantially aromatic polyol moiety and (4) an aliphatic acidic moiety in chemically combined form, and group (C) polyester and copolyester resins consisting essentially of (5) an aromatic-containing polyol moiety and (6) an aromatic-containing acidic moiety in chemically combined form.

4. The resinous material of claim 3 wherein said group (A) resins consist essentially of: (1) a substantially aromatic acidic moiety and (2) an aliphatic polyol moiety in chemically combined form wherein:

said substantially aromatic acidic moiety is 90–100 mole percent of aromatic dicarboxylic acids selected from the group consisting of benzene dicarboxylic-acid-providing compounds, polynuclear benzene dicarboxylic acids, and mixtures thereof, 0–10 mole percent of $C_2$–$C_{36}$ aliphatic dicarboxylic acids, and 0–5 mole percent of aliphatic polycarboxylic acids having more than two carboxyl groups per molecule; and, said aliphatic polyol moiety is 50–100 mole percent of compounds selected from the group consisting of $C_2$–$C_8$ aliphatic glycols, $C_n$ cycloaliphatic glycols wherein $n$ is an even integer of at least 6, and mixtures of same, 0–50 mole percent of long-chain acylic aliphatic glycols, and 0–5 mole percent of aliphatic polyols having more than two hydrozyl groups per molecule; and said group (B) resins consist essentially of: (3) a substantially aromatic polyol moiety and (4) an aliphatic acidic moiety in chemically combined form, wherein:

said substantially aromatic polyol moiety is 90–100 mole percent of diphenol, 0–10 mole percent of said aliphatic, cycloaliphatic, and long-chain acyclic glycols from said polyol moiety (2), and 0–5 mole percent of said aliphatic polyols having more than two hydroxyl groups; and said aliphatic acidic moiety is 95–100 percent of $C_2$–$C_{36}$ aliphatic dicarboxylic acids and 0–5 mole percent of said polycarboxylic acids having more than two carboxyl groups; and said group (C) resins consist essentially of: (5) an aromatic-containing polyol moiety and (6) an aromatic-containing acidic moiety in chemically combined form, wherein:

said aromatic-containing polyol moiety is 45–100 mole percent of diphenols from said polyol moiety (3), 0–55 mole percent of said aliphatic and cycloaliphatic glycols from said polyol moiety (2), 0–10 mole percent of said long-chain acyclic glycols, and 0–5 mole percent of said aliphatic polyols having more than two hydroxyl groups, wherein the sum of said mole percents equals 100; and said aromatic-containing acidic moiety is 45–100 mole percent of said aromatic dicarboxylic acids from said acidic moiety (1), 0–55 mole percent of said $C_2$–$C_{36}$ aliphatic dicarboxylic acids, and 0–5 mole percent of said polycarboxylic acids having more than two carboxyl groups, wherein the sum of said mole percents equals 100.

5. The resinous material of claim 4 wherein said aliphatic polyol moiety (2) of said group (A) resins contains at least about 90 mole percent of $C_2$–$C_3$ aliphatic glycols, and in said group (C) resins at least about 5 mole percent of the total moieties, based on a total for said acidic moiety plus said polyol moiety of 100 mole percent, is contributed by aliphatic compounds.

6. The resinous material of claim 4 wherein said benzene dicarboxylic-acid-providing compounds are selected from the group consisting of phthalic acid, terephthalic acid, isophthalic acid, the dimethyl and diethyl esters and anhydrides thereof where such exist, 3-methyl phthalic acid, 4-methyl phthalic acid, 3,4-dimethyl phthalic acid, and mixtures of the foregoing, and said $C_2$–$C_8$ aliphatic glycols are selected from the group consisting of ethylene glycol, 1,2-propylene glycol, 1,3-propylene glycol, hexamethylene glycol, tetramethylene glycol, and 1,3-butylene glycol, and mixtures thereof.

7. The resinous material of claim 4 wherein said diphenols are selected from the group consisting of single benzene-nucleus-containing diphenols, condensed benzene nucleus diphenols, alkylidene diphenols, aliphatic-aromatic glycols, and mixtures thereof, and said $C_2$–$C_{36}$ aliphatic dicarboxylic acids are selected from the group consisting of oxalic acid, homologues of oxalic acid, and mixtures of the foregoing.

8. The resinous material of claim 1 wherein said polyester resin is selected from the group consisting of
poly(hexamethylene terephthalate),
poly(tetramethylene isophthalate),
poly(1,3-butylene terephthalate),
poly(1,3-propylene isophthalate),
poly(1,2-propylene terephthalate),
poly(1,2-propylene isophthalate),
poly(ethylene isophthalate),
poly(1,2 - propylene-co-1,4-cyclohexylene-diamethylene terephthalate),
poly(2,2-dimethyl-1,3-propylene terephthalate), and
poly(4,4'-isopropylidene-diphenylene phthalate).

9. The resinous material of claim 1 wherein said polyester resin is in particulate form and is in mixture with particulate polyvinyl chloride resin.

10. A molded product prepared from the resinous material of claim 1.

11. In the process of manufacturing a rigid resinous material containing rigid polyvinyl chloride resin and polyester resin, wherein rigid, solid compositions prepared from said resinous material have a heat deflection temperature not substantially lower than about 6° C. below the heat deflection temperature of solid compositions prepared from resinous material free from said polyester resin, the improvement which comprises blending said resin with polyvinyl chloride resin with between about 2–25 weight parts, basis 100 weight parts of said polyvinyl chloride resin, of at least one polyester resin having a degree of polymerization below about 30 and selected from the group consisting of crystalline polyester resins and amorphous polyester resins, said crystalline polyester resins having a crystalline melting point below the processing temperature of said polyvinyl chloride resin, and said amorphous polyester resins having a second order transition temperature above 20° C.

12. A resinous material containing polyvinyl chloride resin and polyester resin and characterized by enhanced processing properties, wherein rigid, solid compositions prepared from said resinous material have a heat deflection temperature not substantially lower than about 6° C. below the heat deflection temperature of solid compositions prepared from said resinous material free from said polyester resin, which resinous material comprises rigid polyvinyl chloride resin with between about 2–25 weight parts, basis 100 weight parts of said polyvinyl chloride resin, of at least one polyester resin having a degree of polymerization below about 30 and selected from the group consisting of poly(ethylene-co-dioxyethylene terephthalate) and poly(ethylene-co-polyoxyethylene terephthalate).

References Cited

UNITED STATES PATENTS

| | | | |
|---|---|---|---|
| 2,773,851 | 12/1956 | Tolman | 260—873 |
| 3,011,999 | 12/1961 | Parker | 260—873 |
| 3,281,498 | 10/1966 | Watkins | 260—873 |

PAUL LIEBERMAN, Primary Examiner

U.S. Cl. X.R.

260—47, 75